Patented Mar. 11, 1952

2,588,821

UNITED STATES PATENT OFFICE 2,588,821

COATING COMPOSITIONS CONTAINING A DRYING OIL-MODIFIED MENTHANE DERIVATIVE

Lyle M. Geiger, Edgewood, Pa., assignor to The Neville Company, Pittsburgh, Pa., a corporation of Pennsylvania No Drawing. Application October 2, 1947, Serial No. 777,593

10 Claims. (Cl. 106—226)

1

This invention relates to drying oil base coating compositions such, for example, as varnishes, enamels, paints, and the like.

A considerable variety of drying oils, typified by linseed, oiticica, tung (China-wood), perilla, and dehydrated castor oils, i. e., fatty drying oils, have been applied to the formulation of varnish and related coating compositions. Generally, resins, both natural and synthetic, are included in such compositions, as is well known in the trade.

A primary object of the invention is to provide drying oil bases comprising chemically modified drying oils that are productive of coating compositions of improved characteristics, including flexibility, adhesion and resistance to skinning, and which afford economy by providing at shorter oil lengths properties that heretofore required substantially greater oil lengths.

A further object is to provide a simple, effective and desirable method of producing drying oil bases in accordance with the foregoing object.

Yet another object is to provide varnish, enamel, paint and the like drying oil base coating compositions that are formulated from drying oils chemically modified in a particular way, and which form films of improved flexibility, adhesion, water resistance, gloss and resistance to after-yellowing than similar compositions made from unmodified oil, and which afford economies over prior practices.

Other objects will appear hereinafter.

In my copending application No. 777,594, filed October 2, 1947, I have described a product obtained by reacting a natural cyclic terpene, such as a pinene, with ordinary phenol ($C_6H_5OH$) in the presence of a catalyst such as activated clay or the well known Friedel-Crafts metallic chloride catalysts, most suitably boron trifluoride catalyst and its organic molecular complexes. That product I believe to be cis 1–8 bis (parahydroxy phenyl) menthane. Ordinarily it is obtained in a resinous form that appears to be essentially a metastable super-cooled liquid because it can be caused to crystallize from dilute ethanol in the form of white crystals of about 98° C. M. P., and the crystals may be converted into the resinous form by heating above the melting point and subsequent cooling of the melt. In the practice of that invention, the terpene, such as a pinene, is added slowly to a heated mixture of common phenol and the catalyst, the phenol being in at least slight molar excess over the terpene, and preferably two mols of phenol are used per mol of terpene.

2

I have discovered, and it is upon this that the present invention is largely predicated, that the drying oils used for making coating compositions when modified chemically by reaction at elevated temperatures with the said cis 1–8 bis (parahydroxy phenyl) menthane may be formulated into coating compositions that are characterized by highly improved characteristics, as detailed more fully hereinafter.

The aforesaid menthane derivative is not soluble in, or of low compatibility with, drying oils and oleoresinous compositions prior to heat processing. However, when heated to appropriate temperatures the two react, usually with foaming, cessation of which is an indication of termination of reaction. The exact temperature necessary for reaction varies with the drying oil. When properly processed in this way the product is a perfectly homogeneous liquid that is productive of films of similar characteristics and which is productive of coating formulations of greatly improved characteristics, now to be described.

The product is worked up in accordance with standard practice, as by the addition of any of the various resins used for such purposes, and this may be done before or after the reaction, but usually it is desirable to cook the resin in the composition. After cooling, whether or not such resin is used, the product is worked to desirable consistency by the addition of any of the solvents, or volatile thinners, or combinations of them, commonly used in varnishes and related compositions, such as, for instance, petroleum thinners, turpentine, xylol, and other well known solvents and thinners. Properly cooked drying oil bases in accordance with this invention will stand dilution with mineral spirits to non-volatile contents as low as 30 per cent and sub-zero temperatures without precipitation.

Experience has shown that although small proportions of the cis 1–8 bis (parahydroxy phenyl) menthane relative to the oil are effective to produce substantial improvement of film properties, the optimum improvement is had in general at about 8.6 per cent of the menthane derivative, based upon the oil, and that this amount should not be substantially exceeded.

An outstanding feature of the invention is that of strong fortification of the drying oil as a result of the reaction described. In fact, dry films of compositions according to the invention behave as though they contain from 40 to 100 per cent more drying oil than they actually do. This is evidenced by Kauri-reduction values obtained with my new compositions, which show great increase in this value over similar compositions made from oils not modified by reaction with this menthane derivative. This results in greater flexibility and toughness for a given oil length, and it permits conservation of oil without sacrificing standards of those properties.

Compositions made in accordance with this invention possess other important characteristics. For instance, as compared with controls made from identical constituents but without the modification of the oil that underlies this invention, varnishes according to this invention show definite increase in protective life, as in resistance to water, acid and salt spray, freedom from rust, adhesion to metal, and resistance to checking. Also, improved gloss and fullness are inherent, especially on wood, in coatings in accordance with the present invention.

A further and particularly important feature is that compositions according to this invention show no skinning while at the same time drying time is not impeded. And, the modification of oils according to the invention does not result in after-yellowing, pale colored bases are produced by the reaction, and color fidelity in the formulation with pigments is assured.

As indicated above, although the maximum ratio of cis 1-8 bis (parahydroxy phenyl) menthane to drying oils is essentially the same for all of the oils, the cooking temperature varies. As indicating suitable practices, reference may be made now to several of the commonly used drying oils. Dehydrated castor oil does not react below about 500° F., when it proceeds very slowly; the higher the temperature, the less the cooking time needed. Suitably this oil is run to 580° F. and held for the desired body after which the menthane derivative is added and the batch rerun at 580° F. for 5 minutes. Linseed oil reacts somewhat slower than castor oil; using heavy bodied linseed oil of $Z_6$ minimum body the reactants should be cooked for at least 15 minutes at 585° F. In the case of tung oil the best cooking range is from 450° to 550° F., and higher temperatures are not recommended.

The following examples illustrate the preparation of suitable compositions in accordance with the invention although the proportions and ingredients are by way of illustration not limitation.

*Example 1.—Varnish*

160 parts of dehydrated castor oil of a $Z_3$ viscosity were heated to 585° F. and held for 8 minutes when there were added 15 parts of cis 1-8 bis (parahydroxy phenyl) menthane. The mixture was reheated to 565° F. and kept at that temperature for 5 minutes. Then there were added 85 parts of a maleic-modified pentaerythritol rosin ester sold as "Pentalyn G" by the Hercules Powder Co. The varnish was reduced with 260 parts of Stoddard naphtha. After cooling 3.33 parts of lead naphthenate (24% metal) and 2.71 parts of cobalt naphthenate (6% metal) were added.

The varnish passed a Kauri-reduction of 65 per cent, while a similar varnish, made according to an identical procedure but in which the menthane derivative was replaced by "Pentalyn G," did not pass a Kauri-reduction of 30 per cent. In addition, the varnish of this invention showed improved adhesion, gloss, and freedom from skinning, adherence and after-yellowing.

*Example No. 2.—Varnish*

200 parts of dehydrated castor oil of a $Z_3$ viscosity were heated to 585° F. and held for 7 minutes. 18.75 parts of cis 1-8 bis (parahydroxy phenyl) menthane were then added. The mixture was reheated at 585° F. and held for a high string from the paddle (about 5 minutes). Then there were added 81.25 parts of "Pentalyn G." The varnish was reduced with 30 parts of Stoddard naphtha.

This varnish passed a Kauri-reduction of 90 per cent while a similar varnish made up according to an identical procedure but in which the menthane derivative was replaced by "Pentalyn G," did not pass a Kauri-reduction of 30 per cent. In addition, the varnish of this invention showed improved adhesion, gloss and freedom from skinning and after-yellowing.

*Example No. 3.—Pretreated oil*

274.2 parts of dehydrated castor oil of a $Z_3$ viscosity were heated to 590° F. in 30 minutes after which 25.8 parts of cis 1-8 bis (parahydroxy phenyl) menthane were added. The temperature was raised to 585° F. and held for 5 minutes. The batch was allowed to cool. A pretreated oil was obtained of a $Z_7$ viscosity.

*Example No. 4.—Varnish from pretreated oil*

175 parts of pretreated oil of Example No. 3 were heated at 200° F. and 85 parts of "Pentalyn G" dissolved in 85 parts of Stoddard solvent naphtha were added, after which 75 parts of Stoddard solvent naphtha were added, followed by the addition of 3.35 parts of lead naphthenate (24 per cent metal) and 2.7 parts of cobalt naphthenate (6 per cent metal).

The resulting varnish passed a Kauri-reduction of 80 per cent and showed excellent drying qualities, hardness, gloss and freedom from skinning and yellowing.

*Example No. 5.—Fortifying exterior paint vehicle*

1 part of cis 1-8 bis (parahydroxy phenyl) menthane was heated at 585° F. with 2 parts of a heat bodied linseed oil of I viscosity, and held for 45 minutes, after which it was cooled.

*Example No. 6.—White exterior paint*

A paint was made up according to the following formulation with a conventional three roller mill:

455 parts of basic lead carbonate
140 parts of zinc oxide
105 parts of asbestine
84 parts of linseed oil of I viscosity
126 parts of fortifying vehicle of Example No. 5
0.72 parts of manganese naphthenate (6% metal)
5.25 parts of lead naphthenate (24% metal)
8.4 parts of Stoddard naphtha The resulting paint was a highly satisfactory exterior white.

*Example No. 7.—China-wood oil varnish*

158 parts of China-wood oil were heated to 550° F. with 50 parts of cis 1-8 bis (parahydroxy phenyl) menthane and held for 4 minutes, after which an additional 50 parts of the menthane derivative were added. The temperature was allowed to drop to 450° F., after which there were added 211.5 parts of Stoddard naphtha. After cooling 0.815 part of lead naphthenate (24 per cent metal) and 0.725 part of cobalt naphthenate (6 per cent metal) were added. This varnish passed a Kauri-reduction of 45 per cent. It was gas proof, set in 1½ hours, and dried tack free in 8 hours.

*Example No. 8.—Linseed oil varnish*

200 parts of an alkali-refined linseed oil of a $Z_6$ viscosity were heated to 590° F. and held for a slight string off the paddle (about 3 minutes). Then there were 10 parts of cis 1-8 bis (parahydroxy phenyl) menthane and the mixture was reheated to 585° F. and held for 5 minutes. 90 parts of "Pentalyn G" and 300 parts of Stoddard naphtha were then added. After cooling, additions were made of 2.25 parts of lead naphthenate (24 per cent metal) and 0.3 part of cobalt naphthenate (6 per cent metal). The resulting varnish set in 1½ hours, dried overnight, showed a Sward hardness of 16 after 31 hours, and passed a Kauri-reduction of 80 per cent. It was non-yellowing, glossy, and free from skinning. A similar varnish made up according to an identical procedure but in which the menthane derivative was replaced by "Pentalyn G," did not pass a 30 per cent Kauri-reduction.

The examples given describe certain synthetic resinous products as admixtures to the modified drying oils of my invention, but other resinous materials, such as natural resins, modified natural resins, modified and unmodified synthetic resins may be added. Examples mentioned are rosin, polymerized rosin, hardened rosins, colophony, copals, fused copals, ester gums, coumarone-indene resins and modified coumarone-indene resins, styrene resins, modified and unmodified phenolic resins, terpene resins, maleic resins, etc. In addition to the drying oils mentioned in the examples, other oils, such as perilla oil, fish oils, such as menhaden and sardine oil, and others may be used advantageously.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a method of making a drying oil base coating composition, the steps comprising heating to at least about 450° F., a mixture of fatty drying oil and alcohol soluble condensation product of ordinary phenol ($C_6H_5OH$) and a natural cyclic terpene, said condensation product existing in a crystalline form melting at 98° C., and in a metastable resinous form, and cooling the product of said oil and condensation product.

2. In a method of making a drying oil base coating composition, the steps comprising cooking fatty drying oil with cis 1-8 bis (parahydroxy phenyl) menthane at a temperature of at least about 450° F., and cooling the product.

3. A method according to claim 2, said cis 1-8 bis (parahydroxy phenyl) menthane being used in an amount not over about 8.6 per cent by weight of said oil.

4. In a method of making a drying oil base coating composition, the steps comprising cooking fatty drying oil with cis 1-8 bis (parahydroxy phenyl) menthane at a temperature of at least about 450° F., said menthane derivative being used in an amount not over about 8.6 per cent by weight of said oil, cooling the product, and adding volatile thinner to bring it to desired consistency.

5. A method according to claim 4 in which an oil soluble resin compatible with said drying oil-modified menthane derivative is incorporated in the composition.

6. Product of cooking fatty drying oil and cis 1-8 bis (parahydroxy phenyl) menthane.

7. Product of cooking fatty drying oil and not over about 8.6 per cent by weight of cis 1-8 bis (parahydroxy phenyl) menthane.

8. A coating composition consisting essentially of the product of cooking fatty drying oil and cis 1-8 bis (parahydroxy phenyl) menthane, and a volatile thinner.

9. A coating composition consisting essentially of the product of cooking fatty drying oil and not over about 8.6 per cent by weight of cis 1-8 bis (parahydroxy phenyl) menthane, and a volatile thinner.

10. A composition according to claim 9, said composition including also an oil soluble resin compatible with said drying oil-modified menthane derivative.

LYLE M. GEIGER.

REFERENCES CITED

The following references are of record in the file of this patent:

UNITED STATES PATENTS

| Number | Name | Date |
|---|---|---|
| 2,123,898 | Honel et al. | July 19, 1938 |
| 2,207,847 | Auer | July 16, 1940 |
| 2,284,156 | Lemmer et al. | May 26, 1942 |

FOREIGN PATENTS

| Number | Country | Date |
|---|---|---|
| 474,465 | Great Britain | Nov. 2, 1937 |

OTHER REFERENCES

Organic Chemistry, Richter, vol. II, p. 484, under Terpenes: P. Blakiston's Sons & Co., Phila., 1922.